United States Patent [19]

Wachtel

[11] 4,038,204

[45] July 26, 1977

[54] ALKALINE-EARTH METAL HALOPHOSPHATE LUMINESCENT COMPOSITION ACTIVATED BY DIVALENT EUROPIUM AND METHOD OF PREPARING SAME

[75] Inventor: Anselm Wachtel, Parlin, N.J.

[73] Assignee: Westinghouse Electric Corporation, Pittsburgh, Pa.

[21] Appl. No.: 726,464

[22] Filed: May 3, 1968

[51] Int. Cl.$^2$ .............................................. C09K 11/46
[52] U.S. Cl. ............................................... 252/301.4 P
[58] Field of Search ................................... 252/301.4 P

[56] References Cited

U.S. PATENT DOCUMENTS

| 2,986,529 | 5/1961 | McKeag et al. | 252/301.4 P |
| 3,328,620 | 6/1967 | Rimbach | 252/301.4 P |

OTHER PUBLICATIONS

Chemical Abstracts, (No. I), vol. 52, 1958, pp. 8755a & 8755b.
Chemical Abstracts, (No. II), vol. 55, 1961, pp. 19,506e & 19,506f.

*Primary Examiner*—Jack Cooper
*Attorney, Agent, or Firm*—W. D. Palmer

[57] ABSTRACT

The luminescent composition alkaline-earth metal halophosphate activated by divalent europium. The phosphor composition is very efficiently excited by ultraviolet to generate blue-green or blue radiations. The exact peak emission and half-width of the emission is determined by the particular alkaline-earth metal and halogen utilized.

18 Claims, 1 Drawing Figure

ALKALINE-EARTH METAL HALOPHOSPHATE LUMINESCENT COMPOSITION ACTIVATED BY DIVALENT EUROPIUM AND METHOD OF PREPARING SAME

BACKGROUND OF THE INVENTION

The alkaline-earth metal halophosphate phosphor is the most widely used luminescent material. This composition is described in U.S. Pat. No. 2,488,733, issued Nov. 22, 1949. The halophosphate phosphor is the standard phosphor used in fluorescent lamps, and it is activated by antimony or antimony plus manganese. This phosphor has the crystalline structure of the naturally occurring mineral apatite, which is a hexagonal crystal structure. This matrix of material is generally expressed as:

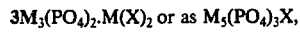

$3M_3(PO_4)_2 \cdot M(X)_2$ or as $M_5(PO_4)_3X$, where M is one or more of the alkaline-earth metals, and X is one or more of the halogens, and generally a fluorine-chlorine mixture. This material is also referred to as apatite structured halophosphate phosphor.

Recent attention in phosphor developments have turned to preparing phosphors which efficiently produce visible light of a narrow bandwidth at a characteristic wavelength when excited by ultraviolet radiation. The characteristic bandwidth is usually referred to as half-width, and is determined by measuring the bandwidth at an emission intensity which is one-half the maximum or peak emission intensity. The rare-earth metals are known to be useful in producing line-emitting, or narrowband-emitting phosphors with various matrices.

Various trivalent rare-earth metals such as terbium and cerium having been added in small amounts to halophosphate compositions to improve phosphor efficiency. Divalent europium is known as an efficient and useful activator with various phosphate compositions.

SUMMARY OF THE INVENTION

It is the general object of the invention to provide an efficient blue-green or blue emitting luminescent composition.

It is more particularly an object of the invention to provide an efficient luminescent composition having the characteristics of efficient excitation by ultraviolet, an emission such that the peak emitted wavelength is in the blue portion of the visible spectrum, and a spectral energy distribution exhibiting a narrow half-width.

It is a further object of the invention to provide a method of producing such a phosphor whereby the efficiency of the luminescent composition is maximized.

These objects and others which will become apparent as the description proceeds are achieved by providing the apatite structure alkaline-earth metal halophosphate composition activated by divalent europium. The phosphor is preferably prepared by adding alkaline-earth metal halide flux to the raw mix, firing the raw mix, and removing the flux.

DESCRIPTION OF THE PREFERRED EMBODIMENTS

Figure 1:
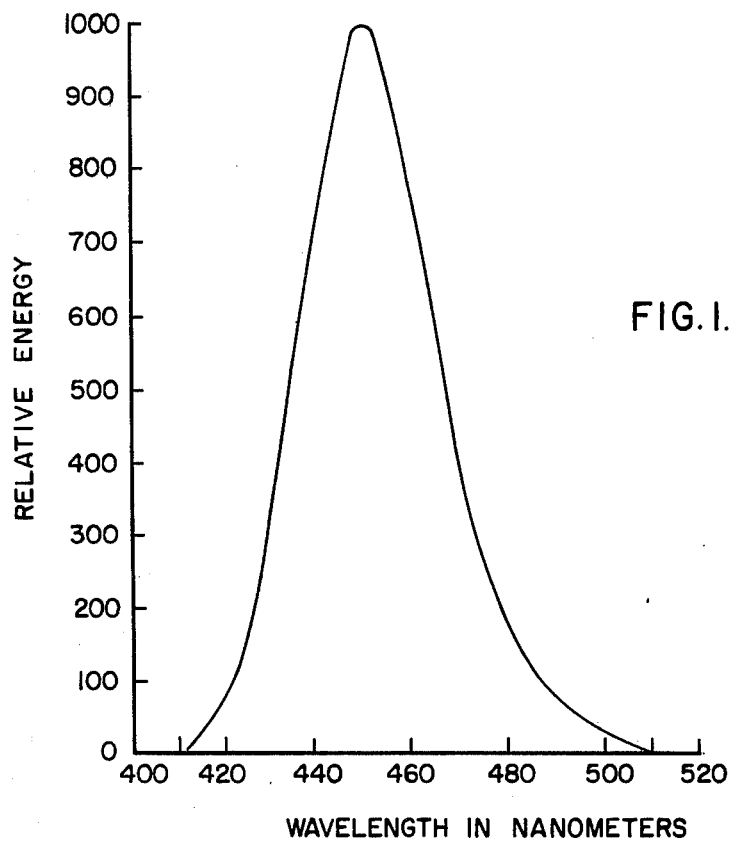
FIG. 1 is a graph of relative energy versus wavelength showing the emission spectrum of a strontium chlorophosphate embodiment of the present phosphor.

To prepare the present halophosphate composition, various raw mix constituents can be utilized to supply the requisite amounts of alkaline-earth metal, phosphate radical, and halogen. A convenient raw mix formulation for preparing europium activated halophosphate is:

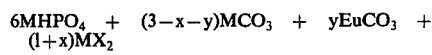

$6MHPO_4 + (3-x-y)MCO_3 + yEuCO_3 + (1+x)MX_2$ wherein M is the alkaline-earth metal, X is the halogen, x can be varied from zero to $(3-y)$, and the value of y is such as to provide a predetermined proportion of activating metal. This raw mix will yield the europium-activated halophosphate of the present invention. The value of x in practice is generally from 0.03 to 0.42 preferably from 0.06 to 0.12, so that phosphorus is present in a 1 to 2 atom percent excess over the amount of phosphorous which could combine as orthophosphate with the metal present in the raw mix in oxygen containing compounds.

It has been further discovered that a particularly advantageous method of preparing the present luminescent composition is to add to the conventional raw mix additional alkaline-earth metal and halogen as alkaline-earth metal halide which apparently serves as a flux in improving the crystallinity and emission intensity of the composition.

EXAMPLE I

As an example, a raw mix which provides the proper proportion of constituents for formulating a halophosphate composition is prepared by mixing 0.6 mole of $SrHPO_4$, 0.27 mole of $SrCO_3$, 0.11 mole of $SrCl_2$, and 0.02 mole of $EuCO_3$. Added to this raw mix is 0.25 mole of additional $SrCl_2$ which serves as a flux during firing. The raw mix is then fired in a reducing atmosphere, for example, a 90% nitrogen-10% hydrogen atmosphere, at from 900° to 1200° C and preferably at 1100° C for about three hours. The reducing atmosphere insures that the europium is incorporated into the phosphor in the divalent state.

It should be noted that including the additional strontium and chlorine as strontium chloride improves the relative luminescent brightness of the phosphor up to about 70 percent. This is to be contrasted with the deleterious effect of providing a great metal to phosphorous ratio in the raw mix when the alkaline-earth metal is not added as halide.

It is preferred that the additional strontium chloride added to the raw mix is in an amount such that it supplies about 20 atom percent of the total strontium in the raw mix. The superior results achieved by preparing the composition from a raw mix including excess strontium and chlorine supplied as strontium chloride are still achieved when the strontium chloride is added in an amount such that it supplies at least 10 atom percent of the total strontium in the raw mix.

While the halophosphate composition can be prepared with large excesses of alkaline-earth metal and halogen in the raw mix supplied as alkaline-earth metal halide, it is preferred not to include additional alkaline-earth metal halide in such amount that the halide supplies more than 50 atom percent of the total strontium in the raw mix. Preparation with large excesses of alkaline-earth metal halide results in a phosphor with large needle-like crystals. When the halide is used as a flux, some of the europium in the raw mix remains with the halide and is removed with the halide during later leaching, as explained hereinafter. For example, while in the foregoing example 0.02 mole of $EuCO_3$ is included in the raw mix, the final composition $Sr_5(PO_4)_3$ $Cl:Eu^{2+}$ contains only about 0.015 gram-atom of europium as determined by X-ray fluorescence, so that the gram atom ratio of europium to total metal, i.e., the ratio of europium to total europium plus strontium, is $1.5 \times 10^{-2}$. Thus, europium is included in the raw mix in an amount of about one-third excess over the europium incorporated as activator into the halophosphate composition. It should also be understood that while the additional strontium chloride is referred to as a flux, a small amount of strontium supplied by the additional strontium chloride, i.e., about 0.005 gram-atom of strontium, is incorporated into the halophosphate composition. The gram-atom ratio of strontium plus europium to phorphorus in the flux-prepared final composition is the same as the ratio of metal to phosphorus in the usual apatite structured stoichiometric halophosphate composition, i.e., a 5/3 ratio.

Figure 2:
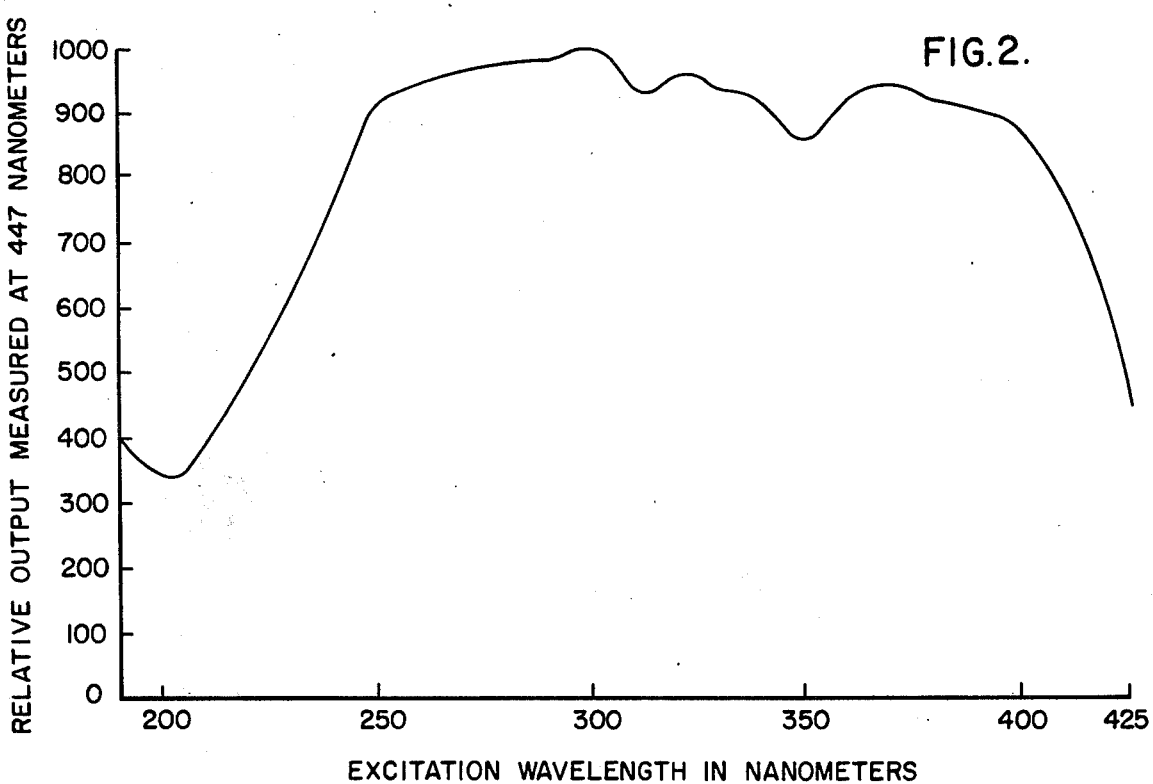
FIG. 2 is a graph of relative output at 447 nm versus excitation wavelength for the preferred strontium chlorophosphate embodiment of the present phosphor.

The use of excess strontium chloride results in a sintered material which, after cooling, is broken up and leached with distilled water to remove residual soluble strontium chloride. The powdery luminescent composition which remains after leaching can be passed through a 400 mesh screen, for example, and will consist of particles which are hexagonal prisms which range in size from about 3 to 20 microns across a crystal face. After washing and drying, the phosphor exhibits a bright bluish-white body color owing to fluorescence excited by the long wavelength ultraviolet normally present in daylight. The emission spectrum of strontium halophosphate composition activated by divalent europium, when excited by 254 nanometer radiations, is shown in FIG. 1 and the peak emission is at about 446.5 nanometers. The excitation spectrum is shown in FIG. 2. The emitted energy is sufficiently concentrated in a band about this peak, which band has a half-width of about 33 nonometers.

EXAMPLE II

The phosphor also may be prepared by thoroughly blending together about 0.6 mole of $SrHPO_4$, about 0.28 mole of $SrCO_3$, about 0.1 mole of $SrCl_2$, and about 0.015 mole of $EuCO_3$. This raw mix is fired in a reducing atmosphere as explained in Example I. In this example all of the strontium chloride included in the raw mix is incorporated into the strontium chlorophosphate composition which is activated by divalent europium. The peak emission wavelength as well as the half-width for this material is the same as for the phosphor produced in Example I.

Example III

In another example a raw mix is prepared from about 0.6 mole of $SrHPO_4$, about 0.28 mole of $SrCO_3$, about 0.09 mole of $SrCl_2$, about 0.01 mole of $SrF_2$, and about 0.015 mole of $EuCO_3$. The raw mix is fired as explained hereinafter to provide a strontium chloro-fluroro-phosphate luminescent composition.

In the foregoing examples, the strontium compounds can be substituted for in whole or in part by similar barium and/or calcium compounds to form the halophosphate formulation, $M_5(PO_4)_3X$, where M is alkaline-earth metal. Specific compounds utilized in the raw mix in the foregoing examples are merely preferred examples, and other alkaline-earth metal compounds and other phosphorus-containing compounds which are well known as being useful in the preparation of the halophosphate matrix can be substituted in proper proportions in the preparation of the present phosphor. The chlorine-containing compounds in the foregoing examples can be substituted for in whole or in part by similar bromine-containing compounds and/or by fluorine-containing compounds to form the halophosphate phosphor.

In the preparation of the halophosphate phosphor as explained in the foregoing examples, it is important that the raw mix be fired in a container which is nonreactive with respect to the raw-mix material, and it has been found that alumina containers meet this requirement.

The following chart demonstrates the effect on the emission characteristic of the phosphor which results from substituting varying percentages of barium and calcium for strontium in prparing the chlorophosphate embodiment as set forth in Examples I and II.

| % Sr | % Ba | % Ca | Peak Wavelength (nm) | Half-width (nm) |
| --- | --- | --- | --- | --- |
| — | — | 100 | 452 | 37.5 |
| — | 100 | — | 436 | 38 |
| 80 | — | 20 | 448.5 | 40.5 |
| 20 | — | 80 | 457 | 42 |
| 80 | 20 | — | 448 | 37 |
| 20 | 80 | — | 464 | 85 |
| 60 | 20 | 20 | 451 | 56 |
| 33.3 | 33.3 | 33.3 | 456 | 80 |

In general, mixtures of the alkaline-earth metal in the present halophosphate phosphor composition result in an emission having a longer peak wavelength, as well as a broader half-width.

The europium incorporated into the alkaline-earth metal halophosphate composition is preferably added as divalent europium such as by adding europium carbonate, as expressed in the examples. However, other europium compounds wherein the europium is in the trivalent state such as europium oxide, europium chloride, or europium salts decomposable to the oxide can be substituted for the europium carbonate. When compounds containing trivalent europium, such as $Eu_2O_3$ are used, the reducing atmosphere employed in the firing process reduces the europium to the divalent state.

When the reduction of europium to the divalent state is incomplete in the composition as evidenced by a yellowish body color, a refiring of the leached composition in a reducing atmosphere is recommended. Such a refiring is more likely to be advantageous when large batches are prepared. It is also found to be advantageous to mix the leached product with about one weight percent of ammonium chloride, and then to refire the mixture, for example in a 99% $N_2$-1% $H_2$ atmosphere for about 1 hour at about 1100° C. The refiring is preferably followed by rewashing and milling of the composition to render it powdery for further usage.

The foregoing examples included a specific amount of europium by way of example. While the amount of europium included in the phosphor can be varied, it is preferred that the gram-atom ratio of europium to total metal, i.e., europium plus alkaline-earth metal, incorporated in the phosphor is from about $3.5 \times 10^{-3}$ to $3.5 \times 10^{-2}$.

The characteristic peak emission of the phosphor is only slightly altered by substitution of bromine or fluorine for the chlorine in the example. For example, when strontium bromide is substituted for strontium chloride in the foregoing examples, the peak emission is at about 447 nanometers. A calcium bromophosphate embodiment exhibits a peak emission at about 457 nanometers. A barium bromophosphate prepared according to the foregoing examples exhibits a peak emission at about 437 namometers.

While a superior phosphor is achieved by including additional alkaline-earth metal halide in the raw mix, the use of alkaline-earth metal fluoride has not been found to be as beneficial as the other halides because of its higher melting point and the difficulty of removing the alkaline-earth metal fluoride from the phosphor after firing. Strontium fluoride can be readily substituted for strontium chloride in Example II, and the resulting phosphor exhibits peak emission at about 433 nanometers.

It has also been discovered that a further improvement in relative luminescent brightness of the phosphor, as well as increased stability of luminescent output after lehring, is achieved by substituting aluminum for strontium in the raw mix in an amount such that the gram-atom ratio of aluminum to total metal, i.e., alkaline-earth plus europium plus aluminum, in the phosphor is from about 0.01 to 0.03. While aluminum is preferably added at $Al(OH)_3$, other aluminum compounds readily decomposable to the oxide can be used.

The alkaline-earth metal halophosphate composition is prepared by firing the raw mix at from about 900° to 1200° C, which temperature is high enough to permit incorporation of the activator into the halophosphate matrix, and is above the melting point of the halide flux. The higher firing temperatures produce a somewhat larger phosphor particle size than that produced at lower firing temperatures. The firing time will depend upon the batch size and at least one hour firing time has generally been found sufficient to fully reduce the europium to the divalent state, as evidenced by the elimination of yellow body color in the fired composition. The longer firing times are helpful in improving crystallization of the composition.

While the invention has been explained by way of specific example, it is not to be limited thereto or thereby.

I claim:

1. A luminescent composition consisting essentially of a matrix of halophosphate of alkaline-earth metal, wherein the halogen if of the group consisting of fluorine, chlorine, bromine, and mixtures thereof, and an activating proportion of divalent europium.

2. The luminescent composition as specified in claim 1, wherein said alkaline-earth metal is strontium, and said halogen is chlorine.

3. The composition as specified in claim 1, wherein the gram-atom ratio of europium to total metal in said composition is from $3.5 \times 10^{-3}$ to $3.5 \times 10^{-2}$.

4. The composition as specified in claim 1, wherein the gram-atom ratio of europium to europium plus alkaline-earth metal in said composition is about $1.5 \times 10^{-2}$.

5. The composition as specified in claim 1, wherein the composition constituents are represented by the formulation $M_5(PO_4)_3X:Eu^{2+}$, in which M is alkaline-earth metal and X is halogen.

6. The composition as specified in claim 1, wherein a portion of said alkaline-earth metal is replaced by aluminum in such amount that the gram-atom ratio of aluminum to total metal in said composition is from about 0.01 to 0.03.

7. The method of preparing a luminescent composition having the matrix $M_5(PO_4)_3X$ and activated by divalent europium, wherein M is the matrix metal and substantially comprises alkaline-earth metal, and X is halogen of the group consisting of fluorine, chlorine, bromine or mixtures thereof, which method comprises:
   a. mixing together raw mix constituents providing said matrix metal, phosphate radical, halogen, and europium in the proportions required to form said luminescent composition;
   b. adding to said raw mix additional alkaline-earth metal and said halogen as alkaline-earth metal halide in an amount such that said halide supplies at least 10 atom percent of the total alkaline-earth metal in said raw mix;
   c. firing the resulting mixtures in a reducing atmosphere at a predetermined temperature for a predetermined time sufficient to form said composition; and
   d. dissolving excess alkaline-earth metal halide from the fired composition.

8. The method as specified in claim 7, wherein said additional alkaline-earth metal halide is added to the raw mix in an amount as to constitute about 20 atom percent of the total alkaline-earth metal in the raw mix.

9. The method as specified in claim 7, wherein 1 to 2 atom percent excess of phosphorus is included in the raw mix over the amount of phosphorus which can combine as orthophosphate with the metal present in the raw mix in oxygen-containing compounds.

10. The method as specified in claim 7, wherein said additional alkaline-earth metal halide is added to the raw mix in an amount such that said halide supplies from 10 to 50 atom percent of the total alkaline-earth metal in said mixture.

11. The method as specified in claim 7, wherein said europium is included in said raw mix in an amount of about $\frac{1}{3}$ excess europium over the amount actually incorporated into said composition.

12. The method as specified in claim 7, wherein a portion of said matrix metal is aluminum in an amount such that the gram-atom ratio of aluminum to total metal in said composition is from about 0.01 to 0.03.

13. The method as specified in claim 7, wherein said dissolving of excess alkaline-earth metal is achieved by leaching said fired composition with distilled water.

14. The method as specified in claim 7, wherein said firing is at from 900° to 1200° C for at least 1 hour.

15. The method as specified in claim 14, wherein said firing is at 1100° C for about 3 hours.

16. A photoluminescent composition consisting essentially of halophosphate of alkaline-earth metal represented by the formula $M_5(PO_4)_3X:Eu^{2+}$, in which M is strontium, calcium, barium, or mixtures thereof, X is fluorine, chlorine, bromine, or mixtures thereof, and the gram-atom ratio of europium to total metal in said composition is from $3.5 \times 10^{-3}$ to $3.5 \times 10^{-2}$.

17. The photoluminescent composition as specified in claim 16, wherein aluminum replaces a portion of said alkaline-earth metal in such amount that the gram-atom ratio of aluminum to total metal in said composition is from about 0.01 to 0.03.

18. A luminescent composition consisting essentially of a matrix of halophosphate of alkaline-earth metal, wherein the alkaline-earth is calcium, barium, and/or strontium, the halogen is chlorine and/or bromine, and an activating proportion of divalent europium.

* * * * *